United States Patent
Saito et al.

(10) Patent No.: US 11,046,861 B2
(45) Date of Patent: Jun. 29, 2021

(54) POWDER COATING MATERIAL

(71) Applicant: AGC Inc., Chiyoda-ku (JP)

(72) Inventors: Shun Saito, Chiyoda-ku (JP); Takashi Morizumi, Chiyoda-ku (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/598,466

(22) Filed: Oct. 10, 2019

(65) Prior Publication Data
US 2020/0040210 A1 Feb. 6, 2020

Related U.S. Application Data

(63) Continuation of application No. PCT/JP2018/015900, filed on Apr. 17, 2018.

(30) Foreign Application Priority Data

Apr. 18, 2017 (JP) .............................. JP2017-082052

(51) Int. Cl.
| | |
|---|---|
| C09D 127/12 | (2006.01) |
| B05D 3/02 | (2006.01) |
| B05D 7/24 | (2006.01) |
| C08F 214/18 | (2006.01) |
| C08F 214/24 | (2006.01) |
| C09D 5/03 | (2006.01) |
| C09D 167/00 | (2006.01) |

(52) U.S. Cl.
CPC ......... C09D 127/12 (2013.01); B05D 3/0254 (2013.01); B05D 7/24 (2013.01); C08F 214/182 (2013.01); C08F 214/247 (2013.01); C09D 5/03 (2013.01); C09D 167/00 (2013.01); *C08F 2800/10* (2013.01)

(58) Field of Classification Search
CPC ...... B05D 1/06; B05D 3/0254; B05D 3/0263; B05D 3/0272; B05D 3/0281; B05D 3/029; B05D 5/08; B05D 5/083; B05D 5/086; B05D 7/24; B05D 7/26; B05D 2202/30; C08F 214/18; C08F 214/182; C08F 214/184; C08F 214/186; C08F 214/188; C08F 214/20; C08F 214/202; C08F 214/205; C08F 214/207; C08F 214/222; C08F 214/225; C08F 214/227; C08F 214/24; C08F 214/242; C08F 214/245; C08F 214/247; C08F 2800/10; C09D 5/03; C09D 5/031; C09D 5/032; C09D 5/033; C09D 5/034; C09D 5/035; C09D 5/036; C09D 5/037; C09D 5/038; C09D 127/00; C09D 127/12; C09D 127/14; C09D 127/16; C09D 127/18; C09D 127/20; C09D 167/00; C08L 27/00; C08L 27/12; C08L 27/14; C08L 27/16; C08L 27/18; C08L 27/20
See application file for complete search history.

(56) References Cited

U.S. PATENT DOCUMENTS

2015/0112015 A1* 4/2015 Jiang ............... C08F 214/188
 524/546
2017/0204274 A1 7/2017 Saito et al.

FOREIGN PATENT DOCUMENTS

| | | |
|---|---|---|
| JP | 5-331388 A | 12/1993 |
| TW | 201623470 A | 7/2016 |
| WO | WO 2013/052790 A2 | 4/2013 |
| WO | WO 2015/060970 A1 | 4/2015 |
| WO | WO 2015/137286 A1 | 9/2015 |
| WO | WO-2015137286 A1 * | 9/2015 ........... C09D 127/12 |
| WO | WO 2016/040525 A1 | 3/2016 |

OTHER PUBLICATIONS

WO2015137286 English Machine Translation prepared Sep. 8, 2020. (Year: 2020).*
Veova-9 technical data sheet, Dec. 31, 2014. (Year: 2014).*
International Search Report dated Jun. 12, 2018 in PCT/JP2018/015900, filed on Apr. 17, 2018 (with English translation).

* cited by examiner

*Primary Examiner* — Christopher M Rodd
(74) *Attorney, Agent, or Firm* — Foley & Lardner LLP

(57) ABSTRACT

A powder coating material which has excellent blocking resistance and can form coating films excellent in water repellency is provided.
The powder coating material of the present invention comprises a fluorinated polymer comprising from 20 to 80 mol % of units based on at least one species selected from the group consisting of $CF_3$—CH=CHF and $CF_3$—CF=$CH_2$, from 18 to 60 mol % of units based on a monomer represented by the formula $X^1$—$Z^1$ (wherein $X^1$ is a specific monovalent polymerizable group, and $Z^1$ is a specific alkyl group, a specific cycloalkyl group or a specific aryl group) and units having a crosslinkable group.

13 Claims, No Drawings

POWDER COATING MATERIAL

TECHNICAL FIELD

The present invention relates to a powder coating material comprising a fluorinated polymer.

BACKGROUND ART

Powder coating materials have been attracting attention from the viewpoint of reducing environmental burdens, and diversification of their application is demanded. Patent Document 1 discloses a powder coating material containing a fluorinated polymer comprising units based on chlorotrifluoroethylene, units based on a hydroxy group and units based on a carboxy group.

PRIOR ART DOCUMENTS

Patent Documents

Patent Document 1: JP-A-H5-331388

DISCLOSURE OF INVENTION

Technical Problem

In view of stable production and storage, powder coating materials with good blocking resistance are demanded. Further, powder coating materials have seen a growing demand on physical properties of coating films they form in recent years, and powder coating materials which form coating films excellent in water repellency (especially dynamic water repellency as a measure of how easily water slides down on a coating film) on a substrate are demanded.

The present inventors have found that the powder coating material disclosed in Patent Document 1 has good blocking resistance but form coating films with insufficient water repellency.

In view of the above-mentioned problem, the present invention aims to provide a powder coating material which has excellent blocking resistance and can form coating films excellent in water repellency, a method for producing a substrate provided with a coating film, and a coated article.

Solution to Problem

As a result of extensive research on the above-mentioned problem, the present inventors have found that use of a fluorinated polymer containing a specific amount of units based on a monomer represented by the after-mentioned formula $X^1$—$Z^1$ and a specific amount of units based on at least one species selected from the group consisting of $CF_3$—$CH$=$CHF$ and $CF_3$—$CF$=$CH_2$ can produce the desired effect and have accomplished the present invention.

Namely, the present inventors have found the following constructions solve the above-mentioned problem.

[1] A powder coating material comprising a fluorinated polymer comprising units based on at least one species selected from the group consisting of $CF_3$—$CH$=$CHF$ and $CF_3$—$CF$=$CH_2$, units based on a monomer represented by the formula $X^1$—$Z^1$ and units having a crosslinkable group, wherein the content of units based on at least one species selected from the group consisting of $CF_3$—$CH$=$CHF$ and $CF_3$—$CF$=$CH_2$ is from 20 to 80 mol % relative to all the units in the fluorinated polymer, and the content of units based on a monomer represented by the formula $X^1$—$Z^1$ is from 18 to 60 mol % relative to all the units in the fluorinated polymer, and the symbols in the formulae have the following meanings:
$X^1$ is $CH_2$=$CHC(O)O$—, $CH_2$=$C(CH_3)C(O)O$—, $CH_2$=$CHOC(O)$—, $CH_2$=$CHCH_2OC(O)$—, $CH_2$=$CHO$— or $CH_2$=$CHCH_2O$—, $Z^1$ is a $C_{4-8}$ alkyl group represented by the formula —$C(Z^{R1})_3$, a $C_{6-10}$ cycloalkyl group, a $C_{6-10}$ cycloalkylalkyl group, a $C_{6-10}$ aryl group or a $C_{7-12}$ aralkyl group, and each of the three $Z^{R1}$'s is independently a $C_{1-5}$ alkyl group.

[2] The powder coating material according to [1], wherein the fluorinated polymer comprise units based on $CF_3CH$=$CHF$ and units based on $CF_3$—$CF$=$CH_2$.

[3] The powder coating material according to [1] or [2], wherein $Z^1$ is a $C_{4-8}$ alkyl group represented by the formula —$C(Z^{R1})_3$ or a $C_{6-10}$ cycloalkyl group.

[4] The powder coating material according to any one of [1] to [3], wherein $X^1$ is $CH_2$=$CHOC(O)$— or $CH_2$=$CHCH_2OC(O)$—.

[5] The powder coating material according to any one of [1] to [4], wherein the crosslinkable group is a hydroxy group or a carboxy group.

[6] The powder coating material according to any one of [1] to [5], wherein the content of units having a crosslinkable group is from 1 to 20 mol % relative to all the units in the fluorinated polymer.

[7] The powder coating material according to any one of [1] to [6], wherein the fluorinated polymer has a glass transition temperature of from 40 to 120° C.

[8] The powder coating material according to any one of [1] to [7], wherein the fluorinated polymer further comprises units based on a monomer represented by the formula $X^3$—$Z^3$ in an amount of more than 0 mol % and at most 40 mol % relative to all the units in the fluorinated polymer, and the symbols in the formula have the following meanings:
$X^3$ is $CH_2$=$CHC(O)O$—, $CH_2$=$C(CH_3)C(O)O$—, $CH_2$=$CHOC(O)$—, $CH_2$=$CHCH_2OC(O)$—, $CH_2$=$CHO$— or $CH_2$=$CHCH_2O$—, and $Z^3$ is a $C_{1-24}$ alkyl group other than a $C_{4-8}$ alkyl group represented by the formula —$C(Z^{R1})_3$.

[9] The powder coating material according to [8], wherein $X^3$ is $CH_2$=$CHOC(O)$— or $CH_2$=$CHCH_2OC(O)$—.

[10] The powder coating material according to any one of [1] to [7], wherein the fluorinated polymer comprises units based on a monomer represented by the formula $X^1$—$Z^1$ wherein $X^1$ is $CH_2$=$CHOC(O)$— or $CH_2$=$CHCH_2OC(O)$—, or the fluorinated polymer further comprises units based on a monomer represented by the formula $X^3$—$Z^3$ wherein $X^3$ is $CH_2$=$CHOC(O)$— or $CH_2$=$CHCH_2OC(O)$—, and $Z^3$ is a $C_{1-24}$ alkyl group other than a $C_{4-8}$ alkyl group represented by the formula —$C(Z^{R1})_3$, and the total content of units based on a monomer represented by the formula $X^1$—$Z^1$ and units based on a monomer represented by the formula $X^3$—$Z^3$ is from 15 to 60 mol % relative to all the units in the fluorinated polymer.

[11] The powder coating material according to any one of [1] to [10], which further comprises a fluorine-free resin.

[12] The powder coating material according to [11], wherein the fluorine-free resin is at least one species selected from the group consisting of a polyester resin, a (meth)acrylic resin, a urethane resin and an epoxy resin.

[13] A method for producing a substrate provided with a coating film, which comprises applying the powder coating material as defined in any one of [1] to [12] to form a coating layer, and heating the coating layer to form a coating film on the substrate.

[14] A coated article comprising a substrate and a coating film formed from the powder coating material as defined in any one of [1] to [12] on the substrate.

Advantageous Effects of Invention

As described below, according to the present invention, it is possible to provide a powder coating material excellent in blocking resistance which forms coating films excellent in water repellency (which means especially dynamic water repellency as a measure of how easily water slides down on a coating film hereinafter), a method for producing a substrate provided with a coating film and a coated article.

DESCRIPTION OF EMBODIMENTS

Terms used in the present invention have the following meanings.

A "(meth)acrylate" is a generic term for "an acrylate" and "a methacrylate", and "(meth)acryl" is a generic term for "acryl" and "methacryl".

A "unit" is a generic term for an atomic group derived from 1 molecule of a monomer by polymerization directly, or by polymerization and subsequent partial chemical modification. The contents (mol %) of specific units relative to all the units in a polymer are determined by analyzing the polymer by nuclear magnetic resonance spectrometry and can also be estimated from the amounts of the respective monomers charged.

The "average particle diameter" of particles is a 50% volume average particle diameter calculated from the particle size distribution measured with a known laser diffraction particle size distribution analyzer (e.g. manufactured by Sympatec GmbH under the trade name "Helos-Rodos").

"Glass transition temperature" is midpoint glass transition temperature measured by differential scanning calorimetry (DSC). "Glass transition temperature" may be referred to also as Tg.

"Melt viscosity" is the melt viscosity of a polymer at a given temperature measured with a rotary rheometer while heating the polymer from 130° C. to 200° C. at a heating rate of 10° C./m in.

The "number average molecular weight" and the "weight average molecular weight" are measured by gel permeation chromatography (GPC) using polystyrene as the standard. The "number average molecular weight" may be referred to also as "Mn", and the "weight average molecular weight" may be referred to also as "Mw".

"Hydroxy value" is a numerical value measured in accordance with JIS K 1557-1 (2007).

"Acid value" is a numerical value measured in accordance with JIS K 0070-3 (1992).

"Film thickness" is a numerical value measured with an eddy-current thickness meter ("EDY-5000", manufactured by SANKO ELECTRONIC LABORATORY CO., LTD.).

The powder coating material of the present invention comprises units (hereinafter also referred to also as "units F") based on at least one species (hereinafter also referred to also as "monomer F") selected from the group consisting of $CF_3$—CH=CHF and $CF_3$—CF=$CH_2$, units (hereinafter also referred to also as "units 1") based on a monomer represented by the formula $X^1$—$Z^1$ (hereinafter referred to also as "monomer 1") and units (hereinafter referred to also as "units 2") having a crosslinkable group.

The content of units F in the fluorinated polymer is from 20 to 80 mol % relative to all the units in the fluorinated polymer.

The content of units 1 in the fluorinated polymer is from 18 to 60 mol % relative to all the units in the fluorinated polymer.

The fluorinated polymer is contained in the powder coating material as powder particles.

The present inventors have found that a powder coating material comprising a fluorinated polymer comprising units based on a fluoroethylene (such as vinylidene fluoride, tetrafluoroethylene or chlorotrifluoroethylene) forms coating films having unsatisfactory water repellency and has room for improvement.

A possible solution to this problem is introduction of units based on a monomer having a —$CF_3$ group such as a fluoropropylene (e.g., units F) into the fluorinated polymer because it is expected that when the fluorinated polymer has —$CF_3$ groups, —$CF_3$ groups arranged on the surface impart better water repellency to the resulting coating film. However, introduction of units F lowers the Tg of the fluorinated polymer and results in a powder coating material with poor blocking resistance. Thus, water repellency and blocking resistance are in such a relation that they trade off against each other.

Regarding this problem, the present inventors have found that introduction of a specific amount of units 1 into a fluorinated polymer containing units F as fluoropropylene-based units results in a powder coating material with excellent blocking resistance which can form coating films excellent in water repellency. This is presumably because among fluoropropylenes, a monomer F copolymerizes well with a monomer 1, and the —$CF_3$ group in the monomer F tends to be arranged on the surface of a coating film. This effect is especially remarkable within the preferred scope of the present invention.

Hereinafter, a coating film formed from the powder coating material of the present invention is also referred to as "the present coating film".

The units F in the fluorinated polymer in the present invention are based on a monomer F. Namely, the fluorinated polymer in the present invention may contain either units based on $CF_3$—CH=CHF or units based on $CF_3$—CF=$CH_2$, or may contain both units. The units F preferably consist both units based on $CF_3$—CH=CHF and units based on $CF_3$—CF=$CH_2$ from the viewpoint of evener water repellency of the present coating film. When the units F consists of units based on $CF_3$—CH=CHF and units based on $CF_3$—CF=$CH_2$, the proportion of units based on $CF_3$—CH=CHF to both units is preferably from 10 to 90 mol %, particularly preferably from 60 to 85 mol %.

The content of units F is from 20 to 80 mol %, more preferably 30 to 70 mol %, relative to all the units in the fluorinated polymer. When the content of units F is at least 20 mol %, the present coating film has even better water repellency. When the content of units F is at most 80 mol %, the fluorinated polymer has a high Tg and hence can provide a powder coating material with better blocking resistance.

The units 1 in the fluorinated polymer in the present invention are based on a monomer represented by the formula $X^1$—$Z^1$ (monomer 1). Introduction of units 1 raises the Tg of the fluorinated polymer and improves the blocking resistance of the resulting powder coating material.

The symbols in the formula have the following meanings.

$X^{1'}$ is $CH_2$=CHC(O)O—, $CH_2$=C($CH_3$)C(O)O—, $CH_2$=CHOC(O)—, $CH_2$=CHC$H_2$OC(O)—, $CH_2$=CHO— or $CH_2$=CHC$H_2$O—. As $X^1$, $CH_2$=CHOC(O)—, $CH_2$=CHC$H_2$OC(O)—, $CH_2$=CHO— and $CH_2$=CHC$H_2$O— are preferable, and $CH_2$=CHOC(O)— and $CH_2$=CHC$H_2$OC(O)— are particularly preferable because the monomer 1 would copolymerize with a monomer F with a high alternating tendency, forming a fluorinated polymer with excellent weather resistance.

When $X^1$ is $CH_2=CHOC(O)-$ or $CH_2=CHCH_2OC(O)-$, it is believed that the presence of the polar ester bond prevents the fluorinated polymer from electrification. Therefore, a powder coating material containing such a fluorinated polymer tends to be densely packed when forming a coating film, and a coating film having a highly smooth surface is obtained. As a result, a coating film especially excellent in water repellency is obtained.

$Z^1$ is a $C_{4-8}$ alkyl group represented by the formula $-C(Z^{R1})_3$ (wherein each of the three $Z^{R1}$'s is independently a $C_{1-5}$ alkyl group), a $C_{6-10}$ cycloalkyl group, a $C_{6-10}$ cycloalkylalkyl group, a $C_{6-10}$ aryl group or a $C_{7-12}$ aralkyl group, and is preferably a $C_{4-8}$ alkyl group represented by the formula $-C(Z^{R1})_3$ or a $C_{6-10}$ cycloalkyl group from the viewpoint of the weathering resistance of the present coating film.

The group represented by the formula $-C(Z^{R1})_3$ is directly bonded to the group represented by the formula $X^1$ to form a structure having a tertiary carbon atom represented by "C (carbon atom)" in the formula attached to three groups represented by the formula $Z^{R1}$. It is preferred that all the three $Z^{R1}$'s are three methyl groups, that one of them is a methyl group, and the remaining two are independently $C_{2-5}$ alkyl groups, or that two of them are methyl groups, and the other one is a $C_{3-5}$ alkyl group. When one of the three $Z^{R1}$'s is a methyl group, and the remaining two are independently $C_{2-5}$ alkyl groups, it is preferred that the remaining two have from 4 to 6 carbon atoms in total. The group represented by the formula $-C(Z^{R1})_3$ is more preferably a tert-butyl group or a tertiary alkyl group having two methyl groups as two of the groups represented by $Z^{R1}$ and a $C_{3-5}$ alkyl group as the other.

The $C_{6-10}$ cycloalkyl group is preferably a cyclohexyl group.

The $C_{6-10}$ cycloalkylalkyl group is preferably a cyclohexylmethyl group.

The $C_{7-12}$ aralkyl group is preferably a benzyl group.

The $C_{6-10}$ aryl group is preferably a phenyl group or a naphthyl group, particularly preferably a phenyl group.

Some of the hydrogen atoms in the cycloalkyl group, the cycloalkyl moiety of the cycloalkylalkyl group, the aryl group or the aryl moiety of the aralkyl group may be replaced by alkyl groups. In this case, the carbon number of the cycloalkyl group or the aryl group does not count in the carbon number of the alkyl group as a substituent.

Two or more types of monomer 1 may be used in combination.

The monomer 1 may be vinyl pivalate, vinyl neononanoate (manufactured by HEXION Inc., trade name "Veova 9"), vinyl benzoate, tert-butyl vinyl ether, tert-butyl (meth)acrylate, benzyl (meth)acrylate or the like. The monomer is preferably vinyl pivalate or vinyl neononanoate in view of alternating tendency in copolymerization with the monomer F and prevention of electrification of the fluorinated polymer.

The content of units 1 is from 18 to 60 mol %, preferably from 25 to 50 mol %, relative to all the units in the fluorinated polymer, to bring the Tg of the fluorinated polymer within a range more suitable for a powder coating material.

The units 2 in the fluorinated polymer in the present invention have a crosslinkable group. The units 2 may be units based on a monomer having a crosslinkable group (hereinafter also referred to as "monomer 2") or may be units derived from units 2 having a different crosslinkable group in the fluorinated polymer by conversion of the crosslinkable group, such as units obtained by partly or completely converting the hydroxy groups in a fluorinated polymer containing units having a hydroxy group to carboxy groups by treatment with a polycarboxylic acid or its acid halide.

The crosslinkable group may be a hydroxy group, a carboxy group, an amino group, an alkoxysilyl group or the like. The crosslinkable group is preferably a hydroxyl group or a carboxy group from the viewpoint of formation of a harder coating film having a smooth surface densely packed with a powder coating material by preventing electrification of the fluorinated polymer.

The units 2 are preferably units based on the monomer 2. The monomer 2 is preferably a monomer having a hydroxy group or a monomer having a carboxy group. The units 2 and the monomer 2 have no fluorine atoms.

The monomer 2 having a carboxy group may be an unsaturated carboxylic acid or (meth)acrylic acid, and is preferably a monomer represented by the formula $X^{21}-Y^{21}$ (hereinafter also referred to as "monomer 21").

$X^{21}$ is $CH_2=CH-$, $CH(CH_3)=CH-$ or $CH_2=C(CH_3)-$, preferably $CH_2=CH-$ or $CH(CH_3)=CH-$.

$Y^{21}$ is a carboxy group or a monovalent saturated $C_{1-12}$ hydrocarbon group having a carboxyalkyl group, and is preferably a carboxy group or a $C_{1-10}$ carboxyalkyl group.

The monomer 2 having a hydroxy group may be a vinyl ether, vinyl ester, allyl ether, allyl ester or (meth)acrylic ester having a hydroxy group or allyl alcohol, and is preferably a monomer represented by the formula $X^{22}-Y^{22}$ (hereinafter also referred to as "monomer 22") or allyl alcohol.

$X^{22}$ is $CH_2=CHC(O)O-$, $CH_2=C(CH_3)C(O)O-$, $CH_2=CHOC(O)-$, $CH_2=CHCH_2OC(O)-$, $CH_2=CHO-$ or $CH_2=CHCH_2O-$, and is preferably $CH_2=CHO-$ or $CH_2=CHCH_2O-$.

$Y^{22}$ is a hydroxy-containing monovalent saturated $C_{2-12}$ hydrocarbon group. The monovalent saturated hydrocarbon group may be linear or branched. The monovalent saturated hydrocarbon group may be cyclic or contain a cyclic moiety. The monovalent saturated hydrocarbon group is preferably a $C_{2-6}$ alkyl group or an alkyl group containing a $C_{6-8}$ cycloalkylene group.

The monomer 21 may be $CH_2=CHCOOH$, $CH(CH_3)=CHCOOH$, $CH_2=C(CH_3)COOH$, a compound represented by the formula $CH_2=CH(CH_2)_{n2}COOH$ (where n 2 is an integer of 1 to 10), or the like.

The monomer 22 may be $CH_2=CHO-CH_2-cycloC_6H_{10}-CH_2OH$, $CH_2=CHCH_2O-CH_2-cycloC_6H_{10}-CH_2OH$, $CH_2=CHOCH_2CH_2OH$, $CH_2=CHCH_2OCH_2CH_2OH$, $CH_2=CHOCH_2CH_2CH_2CH_2OH$, $CH_2=CHCH_2OCH_2CH_2CH_2CH_2OH$ or the like.

Two or more types of monomer 2 may be used in combination.

When the powder coating material of the present invention contains a curing agent, a crosslinking reaction occurs between fluorinated polymer molecules using the crosslinkable groups in units 2 as the crosslinking sites via the curing agent, and the present coating film becomes harder and improves in film properties such as weather resistance, water resistance, chemical resistance and heat resistance.

The content of units 2 is preferably from 0.1 to 35 mol %, more preferably form 1 to 20 mol %, particularly preferably from 5 to 15 mol %, relative to all the units in the fluorinated polymer.

The fluorinated polymer in the present invention may contain units based on a monomer represented by the formula $X^3$—$Z^3$ (hereinafter also referred to as "units 3") to adjust the melt viscosity of the powder coating material as long as the fluorinated polymer has a Tg suitable for a powder coating material. In this case, the content of units 3 is preferably more than 0 mol % and at most 40 mol % relative to all the units in the fluorinated polymer, and preferably more than 0 mol % and at most 35 mol % to adjust the melt viscosity of the fluorinated polymer.

The symbols in the formula have the following meanings.

$X^3$ is $CH_2$=CHC(O)O—, $CH_2$=C($CH_3$)C(O)O—, $CH_2$=CHOC(O)—, $CH_2$=CHCH$_2$OC(O)—, $CH_2$=CHO— or $CH_2$=CHCH$_2$O—. In view of alternating tendency in copolymerization with the monomer F and weather resistance of the fluorinated polymer, $X^3$ is preferably $CH_2$=CHOC(O)—, $CH_2$=CHCH$_2$OC(O)—, $CH_2$=CHO— or $CH_2$=CHCH$_2$O—, particularly preferably $CH_2$=CHOC(O)— or $CH_2$=CHCH$_2$OC(O)—.

When $X^3$ is $CH_2$=CHOC(O)— or $CH_2$=CHCH$_2$OC(O)—, it is believed that the presence of the polar ester bond prevents the fluorinated polymer from electrification. Therefore, a powder coating material containing such a fluorinated polymer tends to be densely packed when forming a coating film, and a coating film having a highly smooth surface is obtained. As a result, a coating film especially excellent in water repellency is obtained.

$Z^3$ is a $C_{1-24}$ alkyl group other than a $C_{4-8}$ alkyl group represented by the formula —$C(Z^{R1})_3$, wherein each of the three $Z^{R1}$'s is independently a $C_{1-5}$ alkyl group.

Two or more types of monomer 3 may be used in combination.

Specific examples of monomer 3 include ethyl vinyl ether, vinyl acetate, vinyl propionate, nonyl vinyl ether, 2-ethylhexyl vinyl ether, hexyl vinyl ether, n-butyl vinyl ether, vinyl neodecanoate (manufactured by HEXION Inc., trade name "Veova 10" and the like) and the like.

The contents of units F, units 1 and units 2 in the fluorinated polymer in the present invention are preferably from 20 to 80 mol %, from 18 to 60 mol % and from 0.1 to 35 mol %, respectively, and particularly preferably, from 20 to 80 mol %, from 18 to 60 mol % and from 1 to 20 mol %, respectively, relative to all the units in the fluorinated polymer.

The fluorinated polymer in the present invention preferably contains units (hereinafter also referred to as "units 1A") based on monomer 1 wherein $X^1$ is $CH_2$=CHOC(O)— or $CH_2$=CHCH$_2$OC(O)— (hereinafter also referred to as "monomer 1A") or units (hereinafter also referred to as "units 3A") based on monomer 3 wherein $X^3$ is $CH_2$=CHOC(O)— or $CH_2$=CHCH$_2$OC(O)— (hereinafter also referred to as "monomer 3A").

The total content of units 1A and units 3A is preferably from 15 to 60 mol %, more preferably from 20 to 50 mol %, relative to all the units in the fluorinated polymer. Within this range, when a coating film is formed from a powder coating material containing a fluorinated polymer, the fluorinated polymer tends to be densely packed and form a coating film having a highly smooth surface. As a result, a coating film especially excellent in water repellency is obtained.

The fluorinated polymer may contain either units 1A or units 3A, or both units 1A and units 3A.

The total content of units 1A and units 3A equals to the content of either ones when only either of them are contained, and equals to the sum of the contents of both when both of them are contained.

The Tg of the fluorinated polymer in the present invention is preferably from 40 to 120° C., more preferably from 45 to 120° C., further preferably from 50 to 100° C., and particularly preferably from 50 to 80° C. from the view point of improvement in the blocking resistance of the powder coating material.

The melt viscosity of the fluorinated polymer in the present invention at 170° C. is preferably from 10 to 200 Pa·s, more preferably from 20 to 100 Pa·s, further preferably from 20 to 95 Pa·s, and particularly preferably from 20 to 50 Pa·s. The melt viscosity of the fluorinated polymer in the present invention at 200° C. is preferably from 1 to 200 Pa·s, more preferably from 10 to 100 Pa·s, and particularly preferably from 10 to 50 Pa·s. When the melt viscosity is within the above-mentioned range, the coating film has a smoother surface.

The Mn of the fluorinated polymer in the present invention is preferably from 3,000 to 50,000, more preferably from 8,000 to 50,000, particularly preferably from 50,000 to 20,000 from the viewpoint of impact resistance and water repellency of the present coating film.

The content of the fluorinated polymer in the powder coating material of the present invention is preferably from 1 to 100 mass % relative to the total mass of the powder coating material.

The fluorinated polymer in the present invention may be produced by copolymerizing monomers (monomer F, monomer 1 and monomer 2) in the presence of a solvent and a radical polymerization initiator. Monomer 3 may be further copolymerized. In such a case, it is preferable that at least part of monomer 1 is monomer 1A or at least part of monomer 3 is monomer 3A, or both.

Polymerization methods used for production of the fluorinated polymer include suspension polymerization, emulsion polymerization and solution polymerization, and solution polymerization is preferred because the high solubility of monomer F in a solvent makes it easy to introduce a given amount of units F in the fluorinated polymer.

The fluorinated polymer is used for production of the powder coating material as described later preferably after powdered or pelletized. Powder or pellets of the fluorinated polymer are obtained from a solution containing the fluorinated polymer and a solvent by evaporation of the solvent, if necessary, followed by pulverization.

Specific examples of the radical polymerization initiator include peroxidicarbonates, peroxy esters, ketone peroxides, peroxy ketals, peroxycarbonate esters, diacyl peroxides and dialkyl peroxides.

In the polymerization, the reaction temperature is usually from 0 to 130° C., the reaction pressure is usually from 0 to 1.0 MPa, and the reaction time is usually from 1 to 50 hours.

The powder coating material of the present invention preferably contains a curing agent. The curing agent is a compound having at least two groups in the molecule which react with the crosslinkable groups in the fluorinated polymer to form crosslinks between the fluorinated polymer molecules. The curing agent usually has from 2 to 30 groups reactive with the crosslinkable groups.

When the fluorinated polymer has carboxy groups, the curing agent is preferably a compound having at least two epoxy, carbodiimido, oxazoline or 3-hydroxyalkylamido groups in the molecule.

When the fluorinated polymer has hydroxy groups, the curing agent is preferably a compound having at least two isocyanato groups in the molecule or a compound having at least two blocked isocyanato groups.

Specific examples of compounds having at least two epoxy groups in the molecule include triglycidyl isocyanurate (hereinafter referred to as "TGIC"), "TM239" (manufactured by Nissan Chemical Corporation) obtained by introducing a methylene group into a glycidyl moiety of TGIC, "TEPIC-SP" (manufactured by Nissan Chemical Corporation) which is an epoxy compound having a triazine skeleton, "PT-910" (manufactured by HUNTSMAN International LLC.) which is a mixture of glycidyl trimellitate and glycidyl terephthalate.

Specific examples of compounds having at least two carbodiimido groups in the molecule include carbodiimides, polycarbodiimides and the like. As specific compounds, poly(1,6-hexamethylenecarbodiimide), poly(4,4'-methylene-biscyclohexylenecarbodiimide), poly(1,3-cyclohexylenecarbodiimide), poly(1,4-cyclohexylenecarbodiimide), poly(4,4'-dicyclohexylmethanecarbodiimide), poly(4,4'-diphenylmethanecarbodiimide), poly(3,3'-dimethyl-4,4'-diphenylmethanecarbodiimide), poly(naphthalenecarbodiimide), poly(p-phenylenecarbodiimide), poly(m-phenylenedicarbodiimide), poly(tolylcarbodiimide), poly(diisopropylcarbodiimide), poly(methyldiisopropylphenylenecarbodiimide), poly(1,3,5-triisopropylbenzene)polycarbodiimide, poly(1,3,5-triisopropylbenzene)polycarbodiimide, poly(1,5-diisopropylbenzene)polycarbodiimide, poly(triethylphenylenecarbodiimide), poly(triisopropylphenylenecarbodiimide) and the like.

Specific examples of compounds having at least two oxazoline groups in the molecule include EPOCROS WS-500, a WS-700, K-2010, K-2020 and K-2030 (all trade names) manufactured by NIPPON SHOKUBAI CO., LTD.

Specific examples of compounds having at least two ß-hydroxyalkylamido groups in the molecule include N,N,N',N'-tetrakis(2-hydroxyethyl)adipamide (Primid XL-552, manufactured by EMS-CHEMIE AG) and N,N,N',N'-tetrakis(2-hydroxypropyl)adipamide (Primid QM 1260 Primid XL-552, manufactured by EMS-CHEMIE AG).

Specific examples of compounds having at least two isocyanato groups in the molecule include alicyclic polyisocyanates such as isophorone diisocyanate and dicyclohexylmethane diisocyanate, aliphatic polyisocyanates such as hexamethylene diisocyanate and their modified products.

Specific examples of compounds having at least two blocked isocyanato groups in the molecule include compounds obtained by reacting a diisocyanate (such as tolylene diisocyanate, 4,4'-diphenylmethane diisocyanate, xylylene diisocyanate, hexamethylene diisocyanate, 4,4'-methylenebis(cyclohexyl isocyanate), methylcyclohexane diisocyanate, bis(isocyanatomethyl)cyclohexane isophorone diisocyanate, dimeric acid diisocyanate or lysine diisocyanate) with a blocking agent.

Specific examples of the blocking agent include alcohols, phenols, active methylene, amines, imines, acid amides, lactams, oximes, pyrazole, imidazole, imidazoline, pyrimidine and guanidine.

When the powder coating material of the present invention contains a curing agent, the content of the curing agent is preferably from 1 to 50 mass %, particularly preferably from 1 to 20 mass %, relative to the total mass of the fluorinated polymer in the powder coating material.

The powder coating material of the present invention may contain a curing catalyst. The curing catalyst is a compound which promotes the curing reaction by a curing agent and may be selected from known curing catalysts according to the kind of the curing agent.

The powder coating material of the present invention may contain a fluorine-free resin containing no fluorine atoms. When the powder coating material of the present invention contains a fluorine-free resin, the absolute difference between the fluorinated polymer and the resin in SP value is preferably from 0.4 to 16 $(J/cm^3)^{1/2}$ because the resulting coating film tends to have a layer mainly composed of the fluorine-free resin and a layer mainly composed of the fluorinated polymer laminated in this order on the substrate.

When the powder coating material of the present invention contains a fluorine-free resin, the mass ratio of the fluorine-free resin to the fluorinated polymer in the powder coating material of the present invention is preferably from 0.30 to 3.5, more preferably from 0.35 to 3.0.

When the powder coating material of the present invention contains a fluorine-free resin, the present coating film is likely to have a layer mainly composed of the fluorinated polymer on the surface. The reasons are not necessarily clear, but it is supposed that because the fluorinated polymer in the present invention comprises given amounts of specific units, when molten by heating after application of the powder coating material, the fluorinated polymer and tends to migrate toward the surface of the coating film.

Therefore, when the powder coating material of the present invention contains a fluorine-free resin, it forms a more water-repellent coating film having a layer of the fluorinated polymer on the surface, as compared with a powder coating material containing a fluorinated polymer other than the fluorinated polymer in the present invention.

The fluorine-free resin is preferably a resin which is solid at ordinary temperature and ordinary pressure such as a polyester resin, a (meth)acrylic resin, an epoxy resin or a urethane resin. In view of the adhesion of the present coating film to the substrate and prevention of contamination of the layer mainly composed of a fluorine-free resin with the fluorinated polymer, it is preferably a polyester resin or a (meth)acrylic resin, particularly preferably a polyester resin.

Specific examples of the polyester resin include "CRYLCOAT 4642-3®", "CRYLCOAT 4890-0®" and "CRYLCOAT 4842-3®" manufactured by DAICEL-ALLNEX LTD., "U-Pica Coat® GV-250", "U-Pica Coat® GV-740", "U-Pica Coat® GV-175" and "U-Pica Coat® GV-110" manufactured by U-PICA Company. Ltd., and "Uralac® 1680" manufactured by DSM. N.V. and the like.

Specific examples of the (meth)acrylic resin include "FINEDIC® A-249", "FINEDIC® A-251" and "FINEDIC® A-266" manufactured by DIC Corporation, "ALMATEX® PD6200" and "ALMATEX® PD7310" manufactured by Mitsui Chemicals, Inc., and "SANPEX PA-55" manufactured by Sanyo Chemical Industries, Ltd.

Specific examples of the epoxy resin include "Epikote® 1001", "Epikote® 1002" and "Epikote® 4004P" manufactured by Mitsubishi Chemical Corporation, "EPICLON® 1050" and "EPICLON® 3050" manufactured by DIC Corporation, "Epotohto® YD-012", "Epotohto® YD-014" and "Epotohto® YDCN704" manufactured by Nippon Steel & Sumikin Chemical Co., Ltd. and "Denacol® EX-711" manufactured by Nagase ChemteX Corporation, and "EHPE 3150" manufactured by Daicel Corporation.

The powder coating material of the present invention may contain an anticorrosive pigment, an extender pigment, a coloring pigment and other pigments.

Specific examples of the anticorrosive pigment include zinc cyanamide, zinc oxide, zinc phosphate, calcium magnesium phosphate, zinc molybdate, barium borate and zinc calcium cyanamide.

Specific examples of the extender pigment include talc, barium sulfate, mica and calcium carbonate.

Specific examples of the coloring pigment include quinacridone, diketopyrrolopyrrole, isoindolinone, indanthrone, perylene, anthraquinone, dioxazine, benzimidazolone, triphenylmethanequinophthalone, anthropyrimidine, chrome yellow, phthalocyanine, halogenated phthalocyanines, azo pigments (such as azomethine metal complexes and condensed azo), titanium oxide, carbon black, iron oxide, copper phthalocyanine and fused polycyclic pigments.

As the coloring pigment, luster pigments may be mentioned, and specific examples include meal particles (metals such as aluminum, zinc, copper, bronze, nickel, titanium and stainless steel, and alloys thereof), mica particles (mica powder), pearl particles, graphite particles, glass flakes and scaly iron oxide particles.

The content of a pigment, when contained in the powder coating material of the present invention, is preferably at most 40 mass % relative to the entire mass of the powder coating material.

The powder coating material of the present invention may, if necessary, contain components other than those mentioned above (hereinafter referred to as "extra additives"). Specific examples of extra additives include UV absorbers (such as various organic UV absorbers and inorganic UV absorbers), light stabilizers (such as hindered amine light stabilizers), matting agents (such as ultrafine synthetic silica), levelling agents, surface conditioners (for improvement of the surface smoothness of the present coating film), degassers, plasticizers, fillers, heat stabilizers, thickeners, dispersants, antistatic agents, anticorrosives, silane coupling agents, stain-proofing agents, anti-fouling agents and the like.

The powder coating material of the present invention can be produced as described below.

First, a powder of the fluorinated polymer is melt-kneaded at 80 to 130° C., if necessary, together with other ingredients (such as a fluorine-free resin powder, pigments, a curing agent, a curing catalyst and extra additives) to obtain a melt-kneaded product. Then, the melt-kneaded product is cooled to obtain a solid melt-kneaded product. The solid melt-kneaded product is pulverized and classified to obtain a powder coating material with a desired particle size.

The average particle size of the particles constituting the powder coating material of the present invention is preferably from 1 to 100 μm, particularly preferably at least 25 μm and at most 50 μm.

When the average particle size is at least 1 μm, the powder coating material is unlikely to agglomerate and easy to apply evenly in a powder coating process. When the average particle size is at most 100 μm, the present coating film has a smoother surface and good appearance.

The coated article of the present invention comprises a substrate and a coating film (the present coating film) formed from the powder coating material on the substrate.

The material of the substrate may, for example, be an inorganic material, an organic material or an organic-inorganic composite material.

The inorganic material may, for example, be concrete, natural stone, glass or a metal (such as iron, stainless steel, aluminum, copper, brass or titanium).

The organic material may, for example, be plastic, rubber, adhesive or wood

The organic-inorganic composite material may, for example, be fiber-reinforced plastic, resin-reinforced concrete or fiber-reinforced concrete.

Further, the substrate may be one subjected to known surface treatment (e.g., chemical treatment, etc.). The substrate may have a layer of a resin (such as a polyester resin or an acrylic resin) on the surface.

Among those mentioned above, the material of the substrate is preferably a metal, more preferably aluminum. An aluminum substrate is excellent in corrosion resistance, light in weight and suitable for application to building materials, such as exterior members.

The shape, size, etc. of the substrate are not particularly limited.

Specific examples of the substrate include composite panels, curtain wall panels, frames for curtain walls, exterior members for buildings such as window frames, automotive members such as tire wheels, wiper blades and automotive exterior members, construction machinery and frames of motorcycles.

The thickness of the present coating film is preferably from 20 to 1,000 μm, more preferably from 20 to 500 μm. For application to high-rise building members such as aluminum curtain walls, etc., it is preferably from 20 to 90 μm. For application requiring high weather resistance to e.g. air conditioner outdoor units, traffic light poles and traffic signs installed on the coast, it is preferably from 100 to 200 μm.

The coated article of the present invention is preferably produced by applying the powder coating material of the present invention to a substrate to form a coating layer, and heating the coating layer to form the present coating film on the substrate. The coated article is also referred to as a substrate provided with a coating film.

The coating layer is preferably formed by applying the powder coating material of the present invention to a substrate by electrostatic coating, electrostatic spraying, electrostatic dipping, fluidized-bed coating, spraying or the like. Electrostatic coating using a powder coating gun is preferred from the viewpoint of better surface smoothness and stronger hiding power of the present coating film.

The powder coating gun may be a corona charging spray gun or a triboelectric spray gun. A corona charging spray gun charges a powder coating material to be sprayed by corona discharging. A triboelectric spray gun charges triboelectrically a powder coating material to be sprayed.

Heat treatment of the coating layer is preferably carried out so that the powder coating material melts on the substrate by heating to form a molten film of the melt of the powder coating material on the substrate. The molten film may be formed at the same time as formation of the coating layer or separately after formation of the coating layer.

The heating temperature and heating retention time for heating and melting the powder coating material and for maintaining the molten state for a predetermined time, are suitably set depending upon the type and composition of the raw material components of the powder coating material, the thickness, etc. of the desired coating film.

For example, when the fluorinated polymer in the powder coating material of the present invention has carboxyl groups, the coating layer cures at lower temperatures by the reaction of carboxyl groups with a curing agent (a compound having at least two epoxy, carbodiimido, oxazoline or β-hydroxyalkylamido groups in the molecule). The reaction of carboxyl groups with a curing agent is advantageous in that it does not require as high temperatures (about 200° C.) as the reaction of an isocyanate curing agent.

The heating temperature is preferably from 120 to 200° C., and the heating retention time is usually from 2 to 60 minutes.

The molten film is preferably cooled to 20 to 25° C. to form the present coating film. The cooling may be either quenching or annealing, but annealing is preferred in that the present coating film firmly adheres to the substrate.

EXAMPLES

In the following, the present invention will be described in detail with reference to Examples. However, the present invention is not limited to these Examples. Further, blend amounts of the respective components in Tables given later are based on mass. Examples 1 to 4, 8 to 11 and 13 are working Examples, while Examples 5 to 7 and 12 are comparative Examples.

[Ingredients Used for Production of Powder Coating Materials]
(Fluorinated Polymers)
Fluorinated polymers were prepared using the following monomers as described later in Examples.
Monomer F: $CF_3$—CH=CHF (HFO-1234ze), $CF_3$—$CF$=$CH_2$ (HFO-1234yf)
Monomer X: $CF_2$=CFCl (CTFE)
Monomer 1: cyclohexyl vinyl ether (CHVE), vinyl neononanoate (V9) manufactured by HEXION Inc., trade name "Veova 9"; also categorized as monomer 1A), vinyl pivalate (PV) (also categorized as monomer 1A)
Monomer 2: 4-hydroxybutyl vinyl ether (HBVE)
Monomer 3: ethyl vinyl ether (EVE), vinyl acetate (AV) (also categorized as monomer 3A), vinyl neodecanoate (V10) (manufactured by HEXION Inc., trade name "Veova 10"; also categorized as monomer 3A)
(Fluorine-Free Resins)
Polyester resin 1: CRYLCOAT (trade name) 4890-0 (manufactured by DAICEL-ALLNEX LTD., Tg: 61° C., hydroxyl value: 30 mg KOH/g)
Polyester resin 2: CRYLCOAT (trade name) 4642-3 (manufactured by DAICEL-ALLNEX LTD., Tg: 62° C., acid value: 35 mg KOH/g)

Surface conditioner: BYK-360P (trade name) manufactured by BYK-Chemie GmbH

Synthesis Example 1

Into an evacuated autoclave, butyl acetate (396 g), HFO-1234ze (456 g), HFO-1234yf (114 g), CHVE (491 g) and HBVE (128 g) were introduced, then heated with stirring and maintained at 65° C.

Then, 50 mass % xylene solution (2 g) of tert-butyl peroxypivalate (hereinafter also referred to as "polymerization initiator solution") was added to the autoclave to initiate polymerization. During the polymerization, the polymerization initiator solution (14.6 g) was continuously added. After 15 hours of polymerization with stirring, the autoclave was cooled with water, and the solution in the autoclave was filtered. The unreacted monomers were removed from the filtrate using an evaporator to obtain a solution containing a fluorinated polymer.

The solution containing a fluorinated polymer was dried in vacuo at 65° C. for 24 hours to remove the solvent and further dried in vacuo at 130° C. for 20 minutes. The resulting mass of the fluorinated polymer was pulverized to obtain a powder of fluorinated polymer 1.

Fluorinated polymer 1 comprised 40 mol % of units based on HFO-1234ze, 10 mol % of units based on HFO-1234yf, 39 mol % of units based on CHVE and 11 mol % of units based on HBVE. Fluorinated polymer 1 had a Tg of 50° C. and a Mn of 11,000.

Synthesis Examples 2 to 7

Fluorinated polymers 2 to 7 were obtained in the same manner as in Synthesis Example 1 except that the kinds and amounts of monomers were changed.

The physical properties of the fluorinated polymers obtained in the Synthesis Examples are shown in Table 1.

TABLE 1

| Fluorinated polymer No. | | | Syn. Ex. 1 1 | Syn. Ex. 2 2 | Syn. Ex. 3 3 | Syn. Ex. 4 4 | Syn. Ex. 5 5 | Syn. Ex. 6 6 | Syn. Ex. 7 7 |
|---|---|---|---|---|---|---|---|---|---|
| Composition of fluorinated polymer (mol %) | Unit F | HFO-1234ze | 40 | 40 | 50 | 50 | | 67 | 50 |
| | | HFO-1234yf | 10 | 10 | | | | | |
| | Unit X | CTFE | | | | | 50 | | |
| | Unit 1 | CHVE | 39 | 13 | | | | | |
| | | V9 | | 18 | | 10 | | 12 | |
| | | PV | | | 36 | 25 | 39 | | |
| | Unit 2 | HBVE | 11 | 9 | 14 | 5 | 11 | 7 | 14 |
| | Unit 3 | EVE | | | | 5 | | 14 | 18 |
| | | AV | | 10 | | 5 | | | |
| | | V10 | | | | | | | 18 |
| | Tg | | 50 | 51 | 51 | 44 | 52 | 32 | 15 |
| | Mn | | 11,000 | 9,000 | 12,000 | 15,000 | 12,000 | 8,000 | 11,000 |

(Additives)
Curing agent 1: compound having at least two blocked isocyanato groups in the molecule (manufactured by Evonik, VESTAGON® B1530)
Curing agent 2: compound having at least two epoxy groups in the molecule (TGIC)
Curing catalyst: a solution of dibutyltin dilaurate in xylene (10,000-fold dilution)
Pigment: titanium oxide (manufactured by DuPont, Ti-Pure R960 (trade name); titanium oxide content: 89 mass %)
Degasser: benzoin

[Powder Coating Material Production 1]

A powder of fluorinated polymer 1 (52 g), curing agent 1 (13 g), the curing catalyst (0.0021 g), the pigment (35 g), the degasser (0.4 g) and the surface conditioner (1 g) were mixed in a high-speed mixer to obtain a powder mixture. The powder mixture was melt-kneaded in a twin screw extruder at a barrel temperature of 120° C. and pelletized. The resulting pellets were pulverized at 25° C. in a grinder and sieved through a 150-mesh net to obtain powder coating material 1 constituted by particles having an average particle diameter of about 40 μm.

Powder coating materials 2 to 7 were obtained in the same manner as powder coating material 1 except that fluorinated polymers 2 to 7 were used instead of fluorinated polymer 1.
[Powder Coating Material Production 2]

A powder of fluorinated polymer 1 (26 g), polyester resin 1 (59 g), curing agent 1 (15 g), the curing catalyst (0.0032 g), the pigment (53 g), the degasser (0.6 g) and the surface conditioner (1.5 g) were mixed in a high-speed mixer to obtain a powder mixture. The powder mixture was melt-kneaded in a twin screw extruder at a barrel temperature of 120° C. and pelletized. The resulting pellets were pulverized at 25° C. in a grinder and sieved through a 150-mesh net to obtain powder coating material 1-2 constituted by particles having an average particle diameter of about 40 µm.

Powder coating materials 2-2 to 2-5 were obtained in the same manner as powder coating material 1-2 except that fluorinated polymers 2 to 5 were used instead of fluorinated polymer 1.

Powder coating materials 1-3 was obtained in the same manner as powder coating material 1-2 except that the amount of curing agent 1 was changed to 4.5 g, and 10.5 g of curing agent 2 was added.
[Preparation of Test Specimens 1]

The respective powder coating materials were stored airtight at 25° C. for 1 week and evaluated.

Powder coating material 1 was electrostatically applied to one surface of a chromate-treated aluminum plate (substrate) and maintained in a 200° C. atmosphere for 20 minutes to form a molten film of powder coating material 1. The film was left to cool to 25° C. to obtain coated aluminum plate 1 having a coating film made from powder coating material 1 with a thickness of from 55 to 65 µm. The coated aluminum plate was used as a test specimen in the evaluation by the methods described below.

As test specimens for powder coating materials 2 to 5, coated aluminum plates 2 to 5 were prepared similarly.

No test specimens were prepared for powder coating material 6 and powder coating material 7 because they were not stable enough to stay in powder form due to blocking.
[Preparation of Test Specimens 2]

Powder coating material 1-2 was electrostatically applied to one surface of a chromate-treated aluminum plate (substrate) and maintained in a 200° C. atmosphere for 20 minutes to form a molten film of powder coating material 1-2. The film was left to cool to 25° C. to obtain coated aluminum plate 1-2 having a coating film made from powder coating material 1-2 with a thickness of from 55 to 65 µm.

As test specimens for powder coating materials 2-2 to 5-2 and 1-3, coated aluminum plates 2-2 to 5-2 and 1-3 were prepared similarly.

The coated aluminum plates were used as test specimens in the evaluation by the methods described below. The molten film of powder coating material 1-3 was formed at a temperature of 170° C., instead of 200° C.
Blocking Resistance of Powder Coating Material)

Each powder coating material was stored airtight in a vial at 25° C., and the time the powder coating material took to block was measured.

A: No blocking had occurred after 15 days.
B: Blocking occurred after 2 to 14 days.
C: Blocking occurred within 1 day.
(Water-Repellency of Coated Film)

The dynamic contact angle of water with each test specimen was measured, and the standard deviation was calculated.

A 2-µL droplet of pure water was dispensed on a horizontally placed test specimen from a contact angle meter, and the test specimen was gradually tilted, and the tilt angle was measured when the droplet started to slide down. The dynamic contact angle was obtained by averaging five measurements.

S: Dynamic contact angle of 15° or below
A: Dynamic contact angle of greater than 15° and at most 25°
B: Dynamic contact angle of greater than 25° and at most 35°
C: Dynamic contact angle of greater than 35°
(Surface Uniformity of Coating Film)

The dynamic contact angle of water with each test specimen was measured, and the standard deviation was calculated.

A 2-µL droplet of pure water was dispensed on a horizontally placed test specimen from a contact angle meter, and the test specimen was gradually tilted, and the tilt angle was measured when the droplet started to slide down. The standard deviation among ten measurements was calculated and rated on the following scale. A small standard deviation means that the coating film has a uniform surface uniformly covered with a layer mainly composed of the fluorinated polymer as a result of clear separation of the fluorinated polymer and the fluorine-free resin into different layers.

S: standard deviation of at most 1.50
A: standard deviation of greater than 1.50 and at most 3.0
B: standard deviation of greater than 3.0

The results of evaluation of the coating films obtained from the respective powder coating materials are shown in Tables 2 and 3.

TABLE 2

| | | Ex. 1 | Ex. 2 | Ex. 3 | Ex. 4 | Ex. 5 | Ex. 6 | Ex. 7 |
|---|---|---|---|---|---|---|---|---|
| Powder coating material No. | | 1 | 2 | 3 | 4 | 5 | 6 | 7 |
| Evaluation | Blocking resistance of powder coating material | A | A | A | B | A | C | C |
| | Water-repellency of coating film | A | S | S | B | C | — | — |

TABLE 3

| | | Ex. 8 | Ex. 9 | Ex. 10 | Ex. 11 | Ex. 12 | Ex. 13 |
|---|---|---|---|---|---|---|---|
| Powder coating material No. | | 1-2 | 2-2 | 3-2 | 4-2 | 5-2 | 1-3 |
| Evaluation | Surface uniformity of coating film | S | S | A | A | B | S |

As shown in Table 2, use of a fluorinated polymer comprising units F and units 1 in specific amounts relative to all the units in the fluorinated polymer, resulted in good blocking resistance and formation of a coating film with excellent water-repellency (see, Examples 1 to 4).

When units 1 were not contained in the specific amount, the resulting powder coating material was instable with poor blocking resistance and practically unable to use to form a coating film (see, Examples 6 and 7).

Powder coating materials containing a fluorinated polymer comprising specific amounts of units 1A and units 3A had particularly excellent blocking resistance and formed particularly water-repellent coating films (see, Examples 2 and 3).

This application is a continuation of PCT Application No. PCT/JP2018/015900, filed on Apr. 17, 2018, which is based upon and claims the benefit of priority from Japanese Patent Application No. 2017-082052 filed on Apr. 18, 2017. The contents of those applications are incorporated herein by reference in their entireties.

What is claimed is:

1. A powder coating material comprising a fluorinated polymer comprising units based on at least one species selected from the group consisting of $CF_3$—CH=CHF and $CF_3$—CF=$CH_2$, units based on a monomer represented by the formula $X^1$—$Z^1$ and units having a crosslinkable group,
   wherein the content of units based on at least one species selected from the group consisting of $CF_3$—CH=CHF and $CF_3$—CF=$CH_2$ is from 20 to 80 mol % relative to all the units in the fluorinated polymer, and
   the content of units based on a monomer represented by the formula $X^1$—$Z^1$ is from 18 to 60 mol % relative to all the units in the fluorinated polymer, and
   the symbols in the formulae have the following meanings:
   $X^1$ is $CH_2$=CHC(O)O—, $CH_2$=C($CH_3$)C(O)O—, $CH_2$=CHOC(O)—, $CH_2$=CHCH$_2$OC(O)—, $CH_2$=CHO— or $CH_2$=CHCH$_2$O—,
   $Z^1$ is a $C_{4-8}$ alkyl group represented by the formula —C($Z^{R1}$)$_3$, a $C_{6-10}$ cycloalkyl group, a $C_{6-10}$ cycloalkylalkyl group, a $C_{6-10}$ aryl group or a $C_{7-12}$ aralkyl group, and each of the three $Z^{R1}$'s is independently a $C_{1-5}$ alkyl group.

2. The powder coating material according to claim 1, wherein the fluorinated polymer comprise units based on $CF_3$CH=CHF and units based on $CF_3$—CF=$CH_2$.

3. The powder coating material according to claim 1, wherein $Z^1$ is a $C_{4-8}$ alkyl group represented by the formula —C($Z^{R1}$)$_3$ or a $C_{6-10}$ cycloalkyl group.

4. The powder coating material according to claim 1, wherein $X^1$ is $CH_2$=CHOC(O)— or $CH_2$=CHCH$_2$OC(O)—.

5. The powder coating material according to claim 1, wherein the crosslinkable group is a hydroxy group or a carboxy group.

6. The powder coating material according to claim 1, wherein the content of units having a crosslinkable group is from 1 to 20 mol % relative to all the units in the fluorinated polymer.

7. The powder coating material according to claim 1, wherein the fluorinated polymer has a glass transition temperature of from 40 to 120° C.

8. The powder coating material according to claim 1, wherein the fluorinated polymer further comprises units based on a monomer represented by the formula $X^3$—$Z^3$ in an amount of more than 0 mol % and at most 40 mol % relative to all the units in the fluorinated polymer, and
   the symbols in the formula have the following meanings:
   $X^3$ is $CH_2$=CHC(O)O—, $CH_2$=C($CH_3$)C(O)O—, $CH_2$=CHOC(O)—, $CH_2$=CHCH$_2$OC(O)—, $CH_2$=CHO— or $CH_2$=CHCH$_2$O—, and
   $Z^3$ is a $C_{1-24}$ alkyl group other than a $C_{4-8}$ alkyl group represented by the formula —C($Z^{R1}$)$_3$.

9. The powder coating material according to claim 8, wherein $X^3$ is $CH_2$=CHOC(O)— or $CH_2$=CHCH$_2$OC(O)—.

10. The powder coating material according to claim 1, wherein the fluorinated polymer comprises units based on a monomer represented by the formula $X^1$—$Z^1$ wherein $X^1$ is $CH_2$=CHOC(O)— or $CH_2$=CHCH$_2$OC(O)—, or the fluorinated polymer further comprises units based on a monomer represented by the formula $X^3$—$Z^3$ wherein $X^3$ is $CH_2$=CHOC(O)— or $CH_2$=CHCH$_2$OC(O)—, and $Z^3$ is a $C_{1-24}$ alkyl group other than a $C_{4-8}$ alkyl group represented by the formula —C($Z^{R1}$)$_3$, and
   the total content of units based on a monomer represented by the formula $X^1$—$Z^1$ and units based on a monomer represented by the formula $X^3$—$Z^3$ is from 18 to 60 mol % relative to all the units in the fluorinated polymer.

11. The powder coating material according to claim 1, which further comprises a fluorine-free resin.

12. The powder coating material according to claim 11, wherein the fluorine-free resin is at least one species selected from the group consisting of a polyester resin, a (meth) acrylic resin, a urethane resin and an epoxy resin.

13. A method for producing a substrate provided with a coating film, which comprises applying the powder coating material as defined in claim 1 to form a coating layer, and heating the coating layer to form a coating film on the substrate.

* * * * *